Sept. 23, 1969  F. J. ZOLADZ  3,469,218

COMPACT YOKE FOR KINESCOPE

Filed May 24 1967  3 Sheets-Sheet 1

INVENTOR
FRANK J. ZOLADZ
BY James and Franklin
ATTORNEYS

Sept. 23, 1969　　　　　F. J. ZOLADZ　　　　　3,469,218
COMPACT YOKE FOR KINESCOPE
Filed May 24 1967　　　　　　　　　　　　　3 Sheets-Sheet 2

INVENTOR
FRANK J ZOLADZ
BY James and Franklin
ATTORNEYS

United States Patent Office 3,469,218
Patented Sept. 23, 1969

3,469,218
COMPACT YOKE FOR KINESCOPE
Frank J. Zoladz, Willimansett, Mass., assignor to General Instrument Corporation, a corporation of Delaware
Filed May 24, 1967, Ser. No. 640,924
Int. Cl. H01f 7/00; H02b 1/04
U.S. Cl. 335—210                                16 Claims

ABSTRACT OF THE DISCLOSURE

The rear end of the liner projects radially outward further than the rear end of the core and coils, and is there formed into terminal board housings which are displaced forward, for compactness in axial direction. A one-piece cover serves to cover the rear end of the yoke and the terminal board housings, and has centering fingers which engage the neck of the kinescope. There are two sets of locating notches for each terminal board. One set is for temporary use to facilitate pot soldering of the terminal board connections, and the other set is located more deeply in the housings for use after pot soldering. The plastic parts may be assembled with a snap detent action.

Background of the invention

Figure 1:
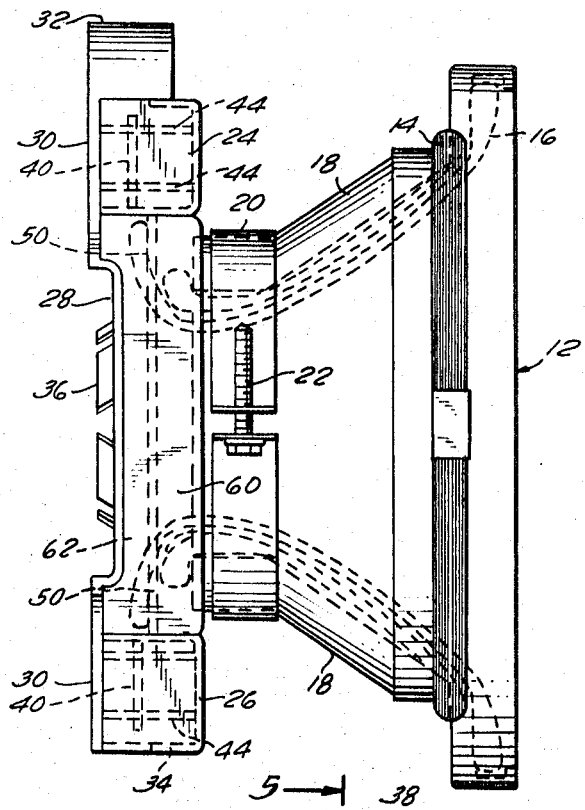

A kinescope yoke usually has a molded flared plastic liner, deflection coils mounted thereon, and core pieces around the coils. There are centering fingers which receive the neck of the kinescope. The liner and cores are usually made in two halves, divided on a plane which extends axially and diametrically of the tube. For convenience it is customary to provide one or more terminal boards for external connections to the coils.

It is important to make the yoke compact in axial dimension, in order to help minimize the final fore and aft dimension of the television receiver. This is urgent in color television because of the need to mount a convergence coil system on the neck of the tube behind the deflection yoke. It is desirable to facilitate assembly of the parts of the yoke, and also to facilitate soldering of the external leads to the coil leads at the terminal boards.

Summary of the invention

In accordance with the present improvement, the rear end of the liner projects radially outward far enough to clear the rear end of the core and coils, and is there formed into a terminal board housing which is displaced forward, for compactness in axial direction. The liner preferably projects radially outward in two opposite directions, in order to provide two such terminal board housings. A one-piece molded plastic cover serves to cover not only the rear end of the yoke, but also the terminal board housings, and also has centering fingers which engage the neck of the kinescope. The molded liner is split on an axial plane which extends from the middle of one terminal board housing to the middle of the other terminal board housing. The cover may provide two walls for each housing, one of said walls being in a plane approximately parallel to the plane of the cover, and the other of said walls being approximately perpendicular to the plane of the cover, in order to give easy access to the housings when they are still open.

The ends of the terminal boards are received in mating notches formed at the ends of the housings, and in preferred form each housing has two sets of notches for its terminal board. One of said sets is located close to the open rear face of the housing for temporary use to facilitate pot soldering of the terminal board connections, and the other set of notches is located further forward, that is, more deeply in the housing, for permanent location of the terminal boards after completion of the pot soldering operation.

The cover may be applied to the rear end of the liner with a snap detent action, and if desired, the forward and rear ends of the split liner each may be molded with detent tongues and with sockets to matingly receive such tongues, in order to thereby hold the halves of the liner in assembled relation when adding the coils etc., without necessitating the use of a special jig or holding fixture for that purpose.

Figure 2:
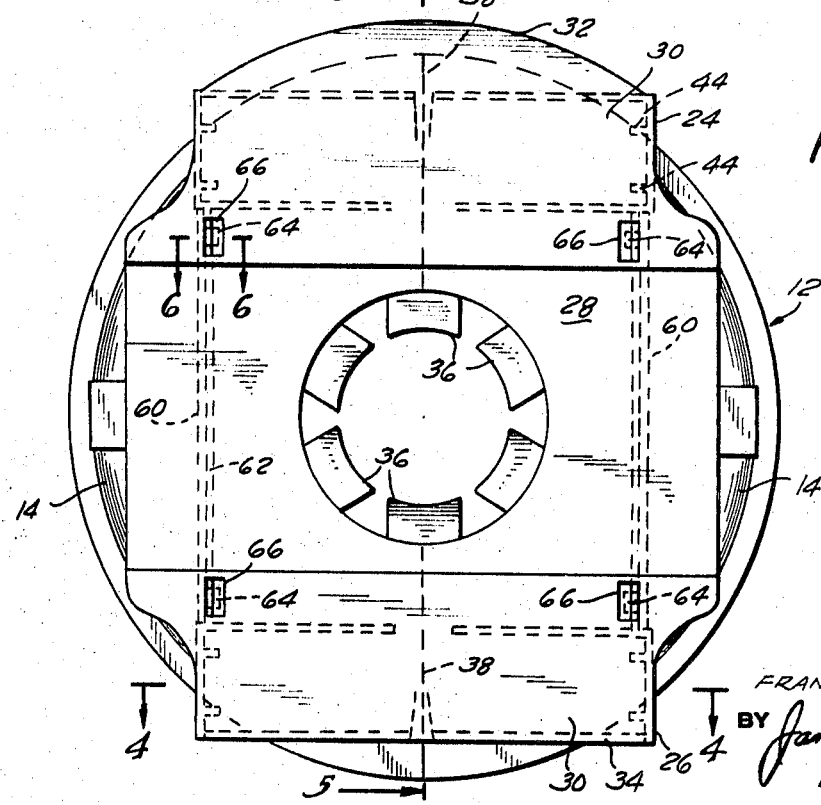
Figure 3:
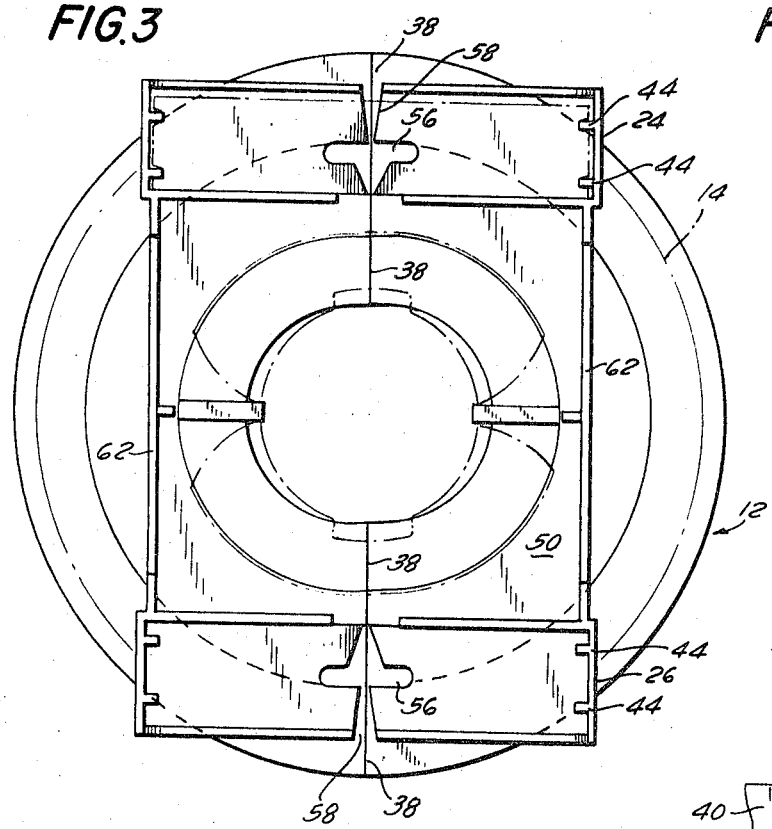
Figure 5:
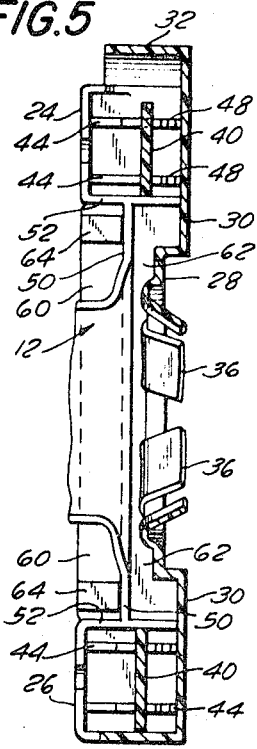
Figure 4:
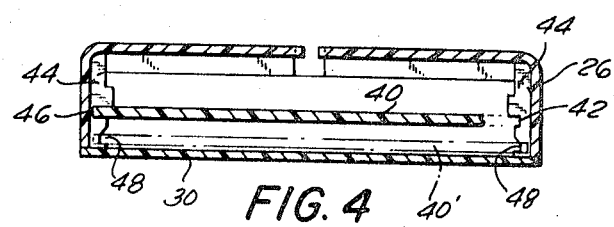
Figure 4A:
Figure 6:
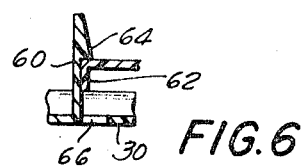
Figure 11:
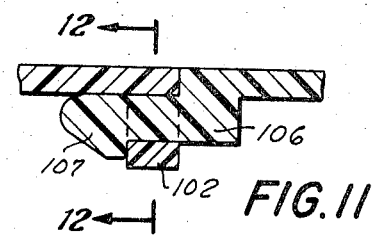
Figure 12:
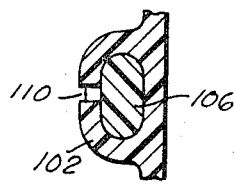
Figure 7:
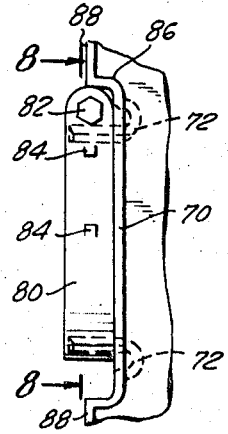
Figure 8:
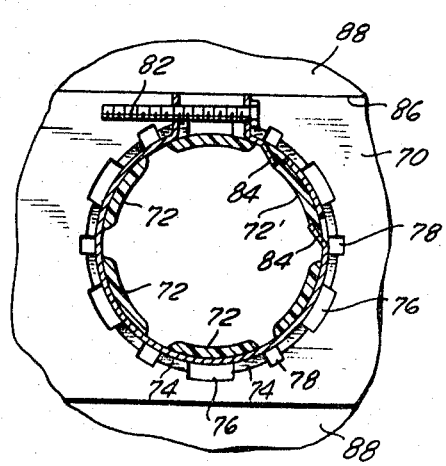
Figure 7A:
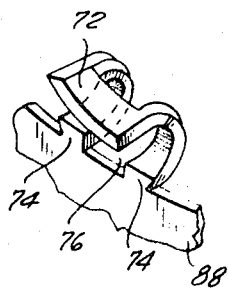
Figure 9:
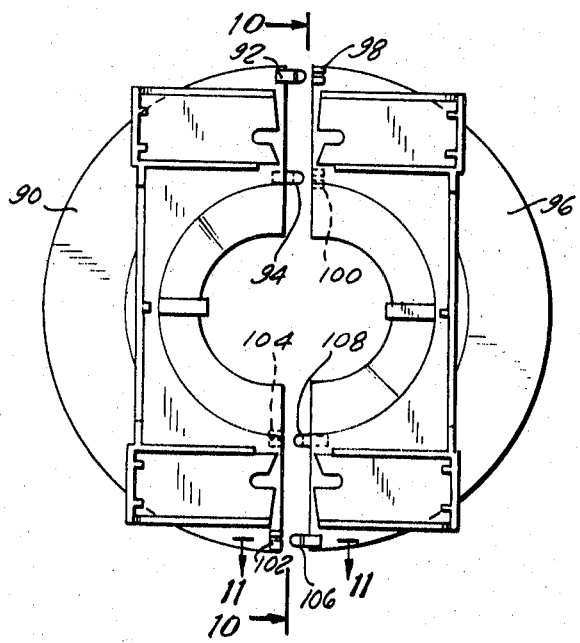
Figure 10:
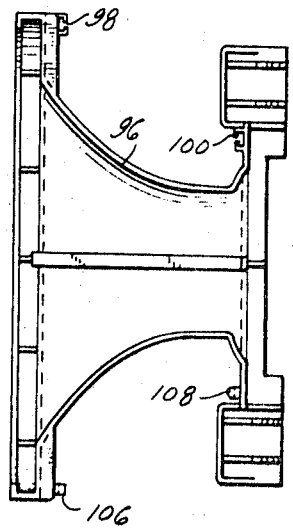

The foregoing and additional features are described in the following detailed specification, which is accompanied by drawings in which:

FIG. 1 is a side elevation of a color kinescope yoke embodying features of the invention;
FIG. 2 is a rear elevation of the same;
FIG. 3 is a rear elevation of the split liner, before adding coils, core pieces, and cover;
FIG. 4 is a section taken approximately on the line 4—4 of FIG. 2;
FIG. 4A is a fragmentary view showing one end of a terminal board;
FIG. 5 is a fragmentary section taken approximately on the line 5—5 of FIG. 2;
FIG. 6 is a fragmentary section taken approximately on the line 6—6 of FIG. 2;
FIG. 7 is a fragmentary elevation corresponding to the center part of FIG. 1, but showing a modification having centering fingers which are combined with a clamp ring;
FIG. 7A shows one of the centering fingers in FIG. 7;
FIG. 8 is a section taken approximately on the line 8—8 of FIG. 7;
FIG. 9 is a rear elevation of a modification in which the halves of the liner have tongues and mating sockets for assembly;
FIG. 10 is an elevation taken on the line 10—10 of FIG. 9 to show one desirable location of the tongues and sockets;
FIG. 11 is an enlarged fragmentary section taken approximately on the line 11—11 of FIG. 9; and
FIG. 12 is a fragmentary section taken approximately on the line 12—12 of FIG. 11.

Referring to the drawing, and more particularly to FIGS. 1–5, the yoke comprises a molded plastic liner generally designated 12, and coils some parts of which are suggested at 14 and in broken lines at 16. There are two core pieces 18 (FIG. 1) around the coils, forming an annular core. The halves are fitted together and held by a metal clamp ring 20, tightened by a clamp screw 22. The rear end 50 of the liner projects radially outward far enough to clear the rear ends of the core pieces and coils, and is formed into a terminal board housing 24 which is displaced forward of the rear end 50 for axial compactness. In the yoke here illustrated the rear end 50 of the liner projects in two opposite directions, upward and downward, and carries two such terminal board housings, the lower one of which is indicated at 26, and similarly is displaced forward for axial compactness.

The rear of the yoke is covered by a one-piece molded plastic cover 28, this being extended both upward and downward, as indicated at 30 in order to provide a closure for the housings 24 and 26. It may also include forwardly directed flanges or edge walls 32 and 34, the top wall 32 being disposed over housing 24, and the bottom wall 34 being disposed under housing 26. The housings then may be open on two sides for easy accessibility when not yet covered. The cover 28 has centering fingers 36 dimensioned to yieldably engage the neck of the kinescope.

The molded liner 12 is split on an axial plane 38 (FIG. 2) which is here shown to be vertical and diametrical. In such case each terminal housing is divided halfway between its ends, as is most clearly shown in FIG. 3, on each side of the dividing plane indicated at 38.

Referring now to FIG. 4, the housed terminal board is shown at 40. The ends of the terminal board are received in mating notches 42 formed at the ends of the housing 26, thus anchoring the terminal board in position. In FIG. 4 one end of the board 40 is broken away to show the notch 42. The notches are formed in two horizontal ridges or rails 44 molded integrally at each end of the housing. The terminal board 40 itself may be notched at 41 (FIG. 4A) to fit around the rails 44, this being shown at 46 in FIG. 4. By notching both the terminal board to fit around the rails, and the rails to receive the terminal board, the latter is fixedly held in desired location.

The rails 44 preferably have two sets of notches for the terminal board. One set indicated in FIG. 4 at 48 is located as close as possible to the open rear face of the housing, and the terminal board is temporarily received in said notches 48 to facilitate a pot soldering operation by which the leads are soldered. These leads are not shown in the drawing, in order not to obscure other parts, but it will be understood that a desired number, say seven, external leads may extend to the two terminal boards, and are there connected to appropriate leads from the coils, with the aid of metal lugs projecting rearward from the terminal boards. These lugs are conventional and are not shown.

After completion of the pot soldering operation the terminal boards are readily moved from the rearward notches 48 to the forward notches 42, which is the permanent location. The temporary location is indicated in broken lines at 40' in FIG. 4. However, it is only after moving the terminal boards more deeply into the housings in the notches 42, as shown in solid lines at 40, that the back cover plate 30 is applied.

In FIGS. 1 and 5 it will be seen that the mid-portion 28 of the cover plate is recessed forwardly, and that the centering fingers 36 then are so disposed that they do not project rearward further than the upper and lower parts 30 of the cover plate. In FIG. 5 the outwardly extended rear end of the liner 12 is shown at 50, and the forward displacement of housings 24 and 26 is shown at 52. This forward displacement is made possible because the radial spacing of the housings from the tube axis is greater than the radius of the coils and cores at their rear end, thus providing the necessary clearance.

The halves of the liner may be secured together by the coils and cores, with the aid of a suitable fixture during assembly. Cement may be added to fix the location of the coils. The forward faces of the terminal housings are preferably apertured or cut away as indicated at 56 (FIG. 3) for passage of lead wires into the housings. The slots or clearance indicated at 58 facilitate handling the leads because they may be passed laterally through the space 58 to reach opening 56, instead of being threaded endwise through the opening 56 where they ultimately rest.

The cover plate preferably has vertical flanges or sides 60 (FIGS. 1, 2 and 5) which project forward around the narrow flanges 62 (FIGS. 1, 2 and 3) of the liner. The sides 60 are preferably much wider than the flanges 62, and may have a width adequate to act as continuations of the end walls of the terminal housings 24 and 26, as will be seen in FIG. 1. FIG. 5 also shows how the side walls 60 of the cover not only enclose but extend further forward than the narrow flanges 62 of the liner, and thus extend forward considerably further than the upright rear wall 50 of the liner.

The inner faces of side walls 60 are provided with four detent lugs 64, best shown in FIGS. 5 and 6. They are so located that they engage the rear wall 50 of the liner, and for this purpose they are preferably given a sloping or wedge shape, as shown in FIG. 6. The detent lugs are also indicated at 64 in FIG. 2, which further shows four slots 66 through the cover plate at the lugs. These slots are provided to facilitate molding of the integral detents 64, so that they may be molded by means of fixed cores.

The bottom wall 34 of back cover 28 fits directly against the otherwise open bottom of the lower terminal housing 26, between the ends of the housing. The top wall 32 is made arcuate, as is most clearly shown in FIG. 2, but is also shown in FIGS. 1 and 5. The top wall 32 may be made flat like the bottom wall 34, and conversely the bottom wall 34 may be made arcuate like the top wall 32. This depends on the preferences of the television set manufacturer, and on the chassis clearances available to him in his particular chassis design.

The details of the cores and the inner and outer coils have not been described because they may be conventional, and form no part of the present improvement.

As so far described the rear end of the yoke assembly is centered on the neck of the picture tube by means of the resiliently yieldable centering fingers 36. The plastics material used is preferably polypropylene, this being somewhat yieldable, which is convenient not only for the centering fingers, but also for the detent action when putting the terminal boards in position, and when snapping the rear cover over the rear end of the yoke as previously described.

In some cases it may be desired to actually clamp the rear end of the yoke around the neck of the kinescope. Such an arrangement is illustrated in FIGS. 7, 7A and 8 of the drawing. For this purpose a somewhat different cover plate 70 is provided, but this cover plate is much like that previously described except that the centering fingers 72 extend axially. They are yieldable because each finger 72 is connected to the back plate 70 at two spaced points 74 (FIG. 7A), there being no material therebetween, as is indicated also in FIG. 8 by the gaps 76. The spaces between fingers are shown at 78. A metal clamp ring 80 (FIG. 7) is disposed around the fingers 72, and may be tightened by a clamp screw 82. In preferred form two tongues 84 may be struck inward from the metal band 80 to engage one of the centering fingers, in this case the centering finger 72' (FIG. 8). This locks the band against rotation so that the clamp screw 82 remains parallel to the step 86 by which the middle area 70 of the backplate is stepped forward relative to the upper and lower areas 88. The parts 88 correspond to the parts 30 shown in FIG. 1, and the part 70 corresponds to the part 28 shown in FIG. 1. The clamp ring 80 projects rearward somewhat from the parts 88, and therefore is not quite as compact axially as the centering fingers 36 shown in FIGS. 1 and 5. However, this rearward projection is slight compared to the yoke constructions heretofore known.

If desired, the halves of the liner may be joined by tongues and mating sockets. Such a construction is shown in FIGS. 9–12, in which the left half of the liner has a tongue 92 (FIG. 9) at its forward end and another tongue 94 at its rear end, while the right half 96 of the liner has mating sockets 98 and 100 to receive the tongues 92 and 94 respectively. At the bottom these parts are reversed, that is, the half 90 has sockets 102 and 104 while the half 96 has tongues 106 and 108. This reversal makes it possible to use similar parts for both halves of the liner.

The location of these tongues and sockets is also shown in FIG. 10, which looks toward the liner half 96 and which shows sockets at 98 and 100 and tongues at 106 and 108. The tongues and sockets are so located as not to interfere with the coils or other structural parts of the yoke.

The tongue and socket are shown to larger scale in FIGS. 11 and 12, the tongue 106 with its enlarged tip 107 being received in socket 102. The socket is preferably split as shown at 110, for greater yieldability. The liner halves 90 (FIG. 9) and 96 are drawn separated in FIG. 9, in order to more clearly show the tongues and sockets, it being understood that in other respects the liner 90, 96 is the same as that previously described with reference to FIGS. 1 through 6 of the drawing.

It is believed that the construction and method of use of my improved compact yoke for kinescopes, as well as the advantages thereof, will be apparent from the foregoing detailed description. It will also be apparent that while I have shown and described the yoke in preferred forms, changes may be made without departing from the scope of the invention, as sought to be defined in the following claims.

I claim:

1. A yoke for a kinescope, said yoke comprising a molded plastic liner and deflection coils and core pieces, said liner being between the vertical deflection coils and the horizontal deflection coils, the rear end of said liner projecting radially outward far enough to clear the rear ends of the core pieces and coils, and there having a terminal board housing which is integral with and is displaced forward of the radial rear end of the liner for axial compactness, and a separate molded plastic cover for the rear end of the yoke and for the terminal board housing, said cover having centering fingers to engage the neck of the kinescope, and means to secure the cover to the back of the liner and terminal board housing.

2. A yoke for a kinescope as defined in claim 1, in which the rear end of the liner projects radially outward in two opposite directions, and has two such terminal board housings both of which are integral with and displaced forward of the radial rear end of the liner for axial compactness, and in which the cover has parts for covering both of said terminal board housings.

3. A yoke for a kinescope as defined in claim 2, in which the molded liner is split on an axial plane extending in a diametrical direction from and through the middle of one terminal board housing to and through the middle of the other terminal board housing, and in which the cover is a one piece cover.

4. A yoke for a kinescope as defined in claim 3, in which the two terminal board housings are each open on two outer sides, and in which the cover provides two walls for each of the terminal board housings, one of said walls being in a plane approximately parallel to the plane of the cover, and the other of said walls being approximately perpendicular to the plane of the cover.

5. A yoke for a kinescope as defined in claim 4, in which there are terminal boards in the terminal board housings, and in which the ends of the terminal boards are received in mating notches formed in the ends of the housings in order to anchor the terminal boards in position.

6. A yoke for a kinescope as defined in claim 4, in which there are terminal boards in the terminal board housings, and in which the ends of the terminal boards are received in mating notches formed in the ends of the housings in order to anchor the terminal boards in position, each housing having two sets of notches for its terminal board, one of said sets of notches being located close to an open face of the housing for temporary use to facilitate pot soldering of the terminal board connections, and the other of said sets of notches being located more deeply in the housings for location of the terminal boards in the housings after the pot soldering operation.

7. A yoke for a kinescope as defined in claim 5, in which the centering fingers are disposed substantially axially, and in which a metal clamping ring is received around said centering fingers and has a clamp screw to tighten the centering fingers around the neck of a kinescope.

8. A yoke for a kinescope as defined in claim 5, in which the forward and rear ends of the liner are each molded integrally with detent tongues, and with sockets to matingly receive such tongues with a snap fit engagement, in order to thereby hold the halves of the liner in assembled relation.

9. A yoke for a kinescope as defined in claim 1, in which the terminal board housing is open on two outer sides, and in which the cover provides two walls for the terminal board housing, one of said walls being in a plane approximately parallel to the plane of the cover and the other of said walls being approximately perpendicular to the plane of the cover.

10. A yoke for a kinescope as defined in claim 1, in which there is a terminal board in the terminal board housing, and in which the end walls of the housing perpendicular to the terminal board have integral inwardly projecting parts, and the ends of the terminal board are received in mating notches formed in said inwardly projecting parts on the end walls of the housing in order to anchor the terminal board in position.

11. A yoke for a kinescope as defined in claim 1, in which there is a terminal board in the terminal board housing, and in which the ends of the terminal board are received in mating notches formed in the ends of the housing in order to anchor the terminal board in position, said housing having two sets of notches for said terminal board, one of said sets of notches being located close to an open face of the housing for temporary use to facilitate pot soldering of the terminal board connections, and the other of said sets of notches being located more deeply in the housing for location of the terminal board in the housing after the pot soldering operation.

12. A yoke for a kinescope as defined in claim 1, in which the outer ends of the centering fingers project forward from the cover and are reversely shaped so that their inner ends project rearward and are disposed substantially axially, and in which a metal clamping ring is received around the inner ends of said centering fingers and has a clamp screw to tighten the centering fingers around the neck of a kinescope.

13. A yoke for a kinescope as defined in claim 1, in which the liner is molded in two halves which meet on an axial plane which is diametrical of the liner, and in which the forward and rear ends of the liner are each molded integrally, with detent tongues having undercut ends, and with sockets to matingly receive such tongues with a resilient snap fit, in order to thereby hold the halves of the liner in assembled relation.

14. A yoke for a kinescope, said yoke comprising a molded plastic liner and deflection coils and core pieces, the rear end of said liner projecting outward, the liner being molded in two halves which meet on an axial plane which is diametrical of the liner, and in which the forward and rear ends of the liner are each molded integrally with detent tongues having undercut ends, and with sockets to matingly receive such tongues with a resilient snap fit, in order to thereby hold the halves of the liner in assembled relation.

15. A yoke for a kinescope, said yoke comprising a molded plastic liner and deflection coils and core pieces, the rear end of said liner projecting radially outward and there having a partial housing to receive and partially house a terminal board, said housing having notches to receive edge parts of the terminal board in order to anchor the terminal board in position, there being two sets of such notches for the terminal board, one of said sets of notches being located close to an open face of the housing for temporary use to facilitate pot soldering of the terminal board connections, and the other of said sets of notches being located more deeply in the housing for location of the terminal board in the housing after the pot soldering operation.

16. A yoke for a kinescope as defined in claim 15, in which the rear end of the liner projects radially outward in two opposite directions and has two such terminal board housings each receiving a terminal board, and in which each housing has the said two sets of notches for its terminal board.

References Cited

UNITED STATES PATENTS

| | | | |
|---|---|---|---|
| 2,852,712 | 9/1958 | Fabel | 335—213 XR |
| 3,136,931 | 6/1964 | Harten et al. | 335—210 |
| 3,287,605 | 11/1966 | McGlashan | 335—213 XR |
| 3,390,363 | 6/1968 | Weyrich et al. | 317—101 XR |

GEORGE HARRIS, Primary Examiner

U.S. Cl. X.R.

317—101